ROWLAND L. SYLVESTER.
GLENN N. ROMINE
INVENTORS.

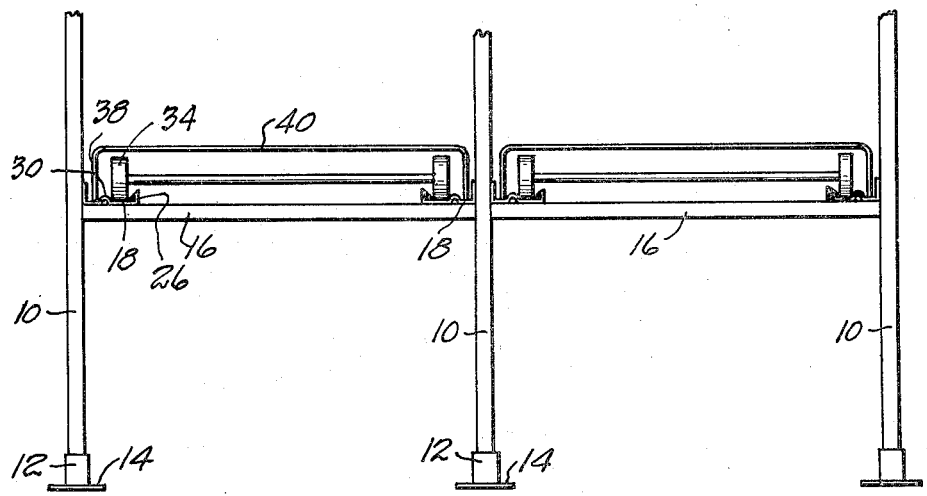
Fig. 1
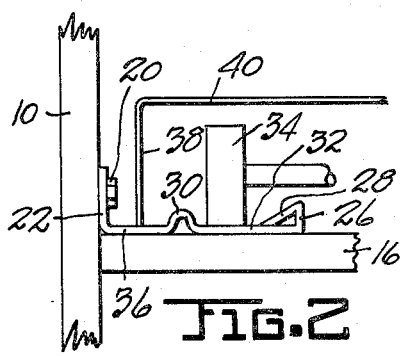
Fig. 2
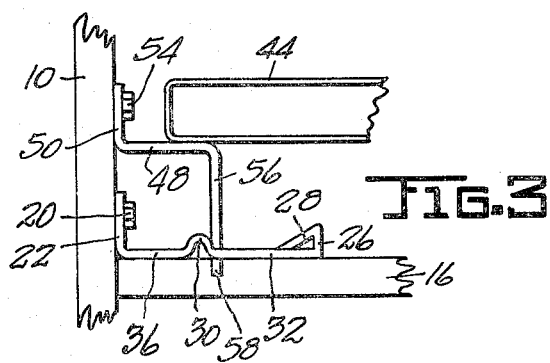
Fig. 3
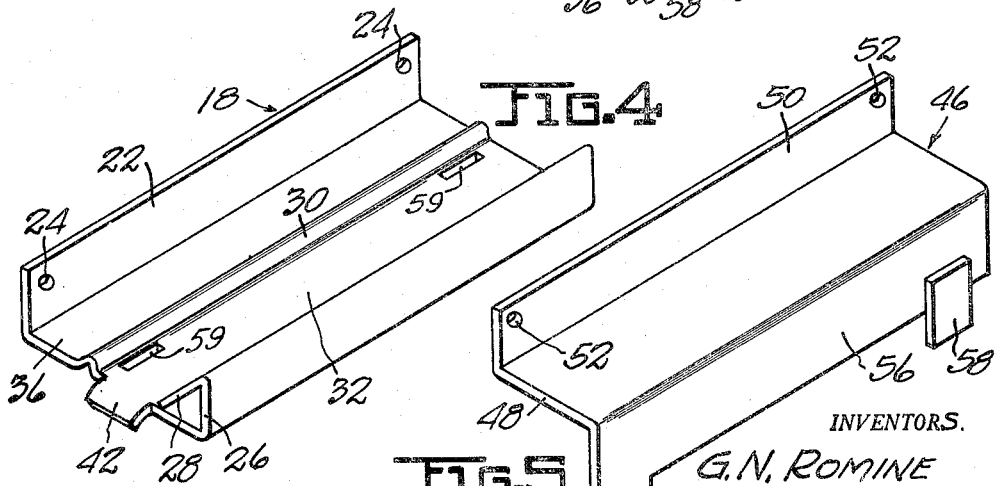
Fig. 4
Fig. 5
INVENTORS.
G. N. ROMINE
R. L. SYLVESTER
BY Eugene O. Kubbock
ATTORNEY.

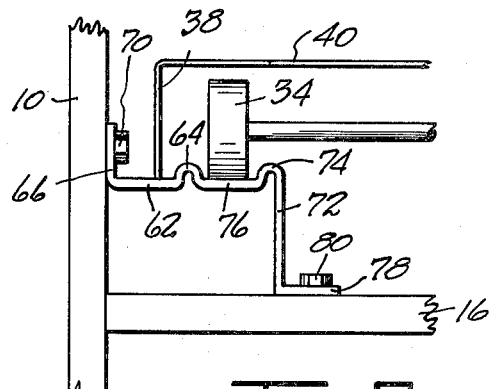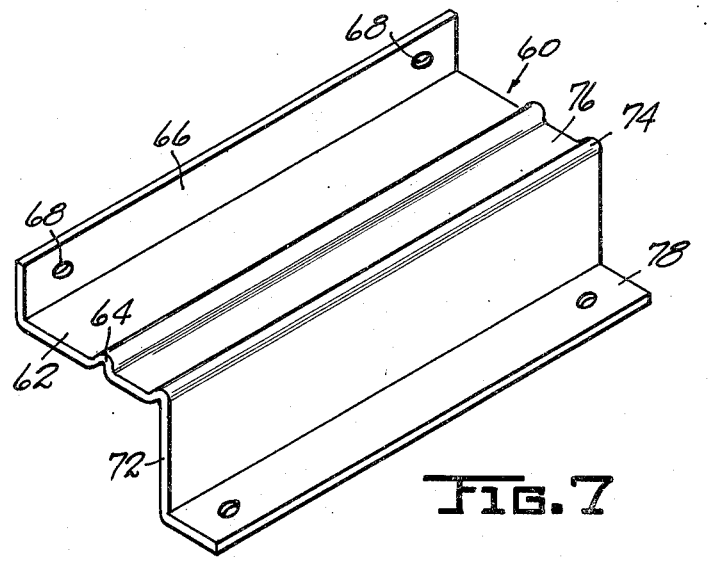

United States Patent Office 3,038,613
Patented June 12, 1962

3,038,613
STORAGE RACK STRUCTURE
Rowland L. Sylvester, South Bend, and Glenn N. Romine, Fort Wayne, Ind., assignors to Rack Specialists, Inc., South Bend, Ind., a corporation of Indiana
Filed Aug. 26, 1957, Ser. No. 680,158
2 Claims. (Cl. 211—162)

This invention relates to improvements in storage rack structures, and more particularly to storage racks used for the selective storage of goods mounted upon load carriers adapted to be manipulated, elevated and lowered by fork lift trucks provided with side transfer attachments. This application constitutes a continuation-in-part of our co-pending patent application for load transfer means for lift trucks, Serial No. 401,478, filed December 31, 1953, now Patent No. 2,804,218, dated August 27, 1957.

The primary object of this invention is to provide a rack for supporting loads mounted on carriers having legs or uprights to accommodate positioning of a side transfer attachment mounted upon a fork lift truck under said carrier for support thereof, wherein the rack provides support for the load carrier and a track for traverse by wheels or rollers of the side transfer attachment while inserting a load into the rack and removing a load from the rack.

A further object is to provide a rack of this character which has a novel, inexpensive, light-weight and strong track capable of detachable mounting upon the rack.

A further object of the invention is to provide a rack having a novel track means to be traversed by a load-supporting wheel which is reinforced to resist bending thereof as wheels travel therealong and wherein the reinforcement provides means to direct the wheels in a desired path.

A further object is to provide a device of this character having track and load support members at different levels, wherein the load support members are detachably mounted upon a rack and are partially supported by the adjacent track members.

Other objects will be apparent from the following specification.

In the drawings:

FIG. 1 is a fragmentary side view of a rack illustrating the manner in which a load carrier is supported thereon and the manner in which the wheeled portion of a side transfer load carrying attachment traverses the rack while introducing a load into the rack and removing the load from the rack.

FIG. 2 is an enlarged fragmentary detail elevational view of the rack with a load carrier thereon and a wheeled unit traversing the same.

FIG. 3 is an enlarged fragmentary detail elevational view similar to FIG. 2, but illustrating a modified form of the invention.

FIG. 4 is a perspective view of a part of the rack illustrated in FIGS. 2 and 3.

FIG. 5 is a perspective view of another part of the rack illustrated in FIG. 3.

FIG. 6 is an enlarged fragmentary detail elevational view similar to FIG. 2 but illustrating another modified form of the invention.

FIG. 7 is a perspective view of a part of the rack illustrated in FIG. 6.

Figure 8:
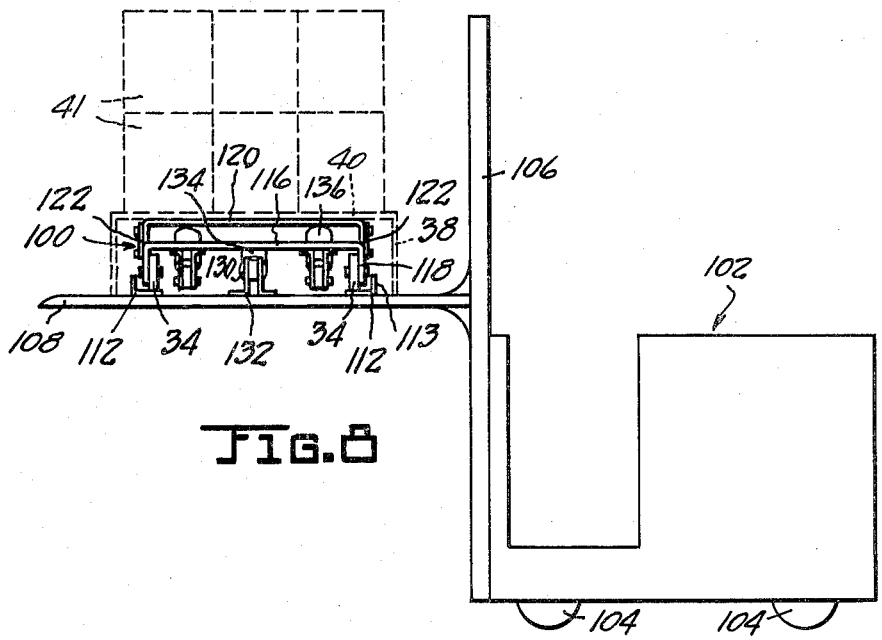
FIG. 8 is a side view of substantially schematic nature illustrating a fork lift truck having our improved load transfer means mounted thereon.

Referring to the drawings, which illustrate various embodiments of the invention, and particularly to FIGS. 1, 2 and 4, which illustrate one embodiment of the invention, the numeral 10 designates rigid upright or column members of selected height. The upright members 10 may be formed of any suitable material and preferably constitute metal tubes or metal structural members of any desired cross sectional shape. The uprights are arranged in two rows, i.e. front and back, and are preferably similarly spaced in said rows. If desired, the uprights may be mounted upon base or foot members 12 which preferably have base plates 14 of large area to distribute the load of the rack over a large area of the floor upon which the rack is supported. The uprights in each row are interconnected at a plurality of vertically spaced points by longitudinal rigid structural members or stringers 16. The members 16 may be welded, bolted or otherwise secured to the uprights. The vertical spacing of the members 16 determines the size of the storage compartments of the racks vertically, and the spacing of the uprights determines the width of the storage compartments of the rack.

The front and back rows of uprights and stringers are interconnected by transverse members 18 to constitute the rack assembly a rigid and strong structure. The members 18 are here shown as formed metal plates bolted to the uprights 10 at 20, but it will be understood that members 18 may be welded or otherwise secured to the other parts of the rack. As shown, the members 18 have a longitudinal flange 22 at one margin thereof, provided with bolt-holes 24 at each end to receive securing bolts 20 for securement to the rack uprights 10. The flange 22 also reinforces the member. At its opposite marginal portion, the member 18 is also preferably configured for reinforcement. In the form shown, an upright flange portion 26 projects above member 18 along its full length and an inwardly and downwardly inclined flange portion 28 completes the reinforcement. In order to further strengthen the member 18, it is preferably provided with an integral off-set rib 30 extending lengthwise thereof substantially mid-width thereof and upwardly crowned or projecting. The portion 32 of member 18 between rib 30 and reinforcement 26, 28 preferably constitutes a wheel track to be traversed by a wheel or roller 34 of a side transfer attachment 100 mounted on a fork lift truck 102, for example of the type illustrated in our Patent No. 2,804,218 aforementioned. The portion 36 between rib 30 and flange 22 preferably constitutes a support for the leg or flange 38 of a pallet, skid or other load carrier 40. It will be understood, however, that the load may be supported at 32 if desired and that part 36 may constitute a track if the construction of the side transfer attachment positions the wheel thereof outwardly of the carrier.

It will be understood that the member 18 need not be an integral part of a rack as constructed initially, and that members 18 may be connected to conventional racks for the purpose of converting the same for use with a side transfer attachment. Also, if desired, the member 18, at the front end of the track-defining portion thereof, may be provided with a downwardly bent or inclined portion 42.

In some instances it may be desired to provide a support for the load 41, such as a pallet member 44, at a level spaced above the wheel track 32 and the rack stringers 16. Such an arrangement can be accommodated by the use of the member 46 illustrated in FIG. 5. Member 46 is preferably a formed metal plate of rigid character having a central longitudinal horizontal platform portion 48 adapted to support a load carrier 44 as seen in FIG. 3. A substantially vertical longitudinal flange 50 at one margin of member 46 has bolt holes 52 accommodating bolts 54 which anchor it to the uprights 10. A downturned longitudinal flange 56 bears upon the member 18 intermediate the width thereof so as to avoid interference with track portion 32. If desired, tabs 58 may project from the lower edge of part 56, for reception in apertures 59 in member 18. The tabs 58 may be integral with part 56, or may be formed as seen at 58' as a separate plate bolted or welded to part 56. In this construction the height of part 56 will be such as to accommodate the movement of a side transfer attachment in vertically contracted condition along the track 32 with clearance relative to the load carrier 44, and at the same time to accommodate elevation of the carrier by the side transfer attachment when the carrier is to be removed from the rack.

In some instances, it may be desired to position both the wheel track and the load carrier support spaced above the level of the stringers 16 of the rack, and a construction accommodating such a relation of parts is shown in FIGS. 6 and 7. A rigid member, such as a plate 60 has a central longitudinal horizontal portion 62 preferably ribbed longitudinally adjacent its center at 64. A substantially vertical flange 66 is formed at one longitudinal margin, and may be apertured at 68 near its ends to receive bolts 70 for securement thereof to the rack uprights 10. A substantially upright portion 72 projects downwardly from the other margin of platform 62, and if desired, a crowned rib or off-set 74 may be provided for reinforcement and for delineation of a wheel track portion 76 in combination with rib 64. A substantially horizontal longitudinal flange 78 may rest upon the rack stringers and be secured thereto, as by bolts 80.

Each of the embodiments of the invention may incorporate an inclined track end portion, similar to the part 42 shown in FIG. 4. Each embodiment may be provided in or constitute an integral rack structure. Also, if desired, any additional structural members may be incorporated in a rack for stabilizing or strengthening the same. Furthermore, members such as those shown in FIGS. 4, 5 and 7 may be used to convert conventional racks for use with a side transfer attachment.

Figure 9:
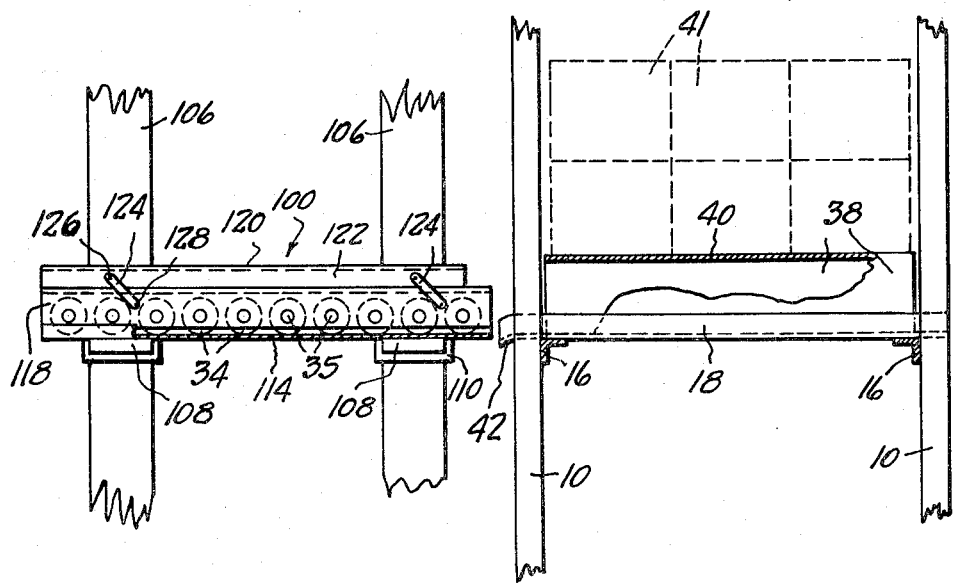
FIG. 9 is a fragmentary front view of our improved load transfer means mounted upon a fork lift truck in load-transferring position or relation to a work storage rack.

Referring to FIGS. 8 and 9, the numeral 102 designates a self-propelled vehicle of the type commonly known as a fork lift truck which is mounted upon wheels 104 and is provided with controls (not shown) by which its movement and operation may be effected by an operator. In the usual form such trucks include a part upon which the operator rides. The truck mounts upright members 106 adapted to be traversed by substantially horizontal fork lift arms 108 which are controlled by positioning means (not shown) of power-operated character capable of supporting, elevating and lowering a load mounted upon the lift fork arms. The fork arms will preferably project lengthwise of the truck 102 and preferably forwardly thereof. The fork lift trucks which are now available on the market vary as to individual construction thereof, but we contemplate that this invention may be practiced with any such truck regardless of its source of manufacture or individual design.

Our improved load transfer means is designated generally by the numeral 100 and is supported upon the fork arms or horizontal supports 108 of the fork lift truck in any manner found suitable. Thus it may be applied or mounted as a fixed and permanent part of the fork lift truck in the manner illustrated in FIG. 8, or it may be mounted upon elongated flat tubes or sleeves or guides 110 which fit snugly but detachably upon the arm 108 as illustrated in FIG. 9. The device includes or operates with reference to a base or support, and this base may either be the lift forks or platform 108 of the truck or separate member carried by the truck forks or supports 108 or by sleeve or tube members 110. The base or support has a pair of track or guide members 112, here shown as angle irons having substantially horizontal webs or portions 114. The guide members 112 extend parallel to each other transversely of the fork arms or supports 108 of the truck and preferably project laterally from the sides of said fork arms or supports, as illustrated in FIG. 9. The lateral projection of the parts will not be great and preferably will not be substantially greater than the overall width of the fork lift truck 102. A wheeled extensible and retractable unit is supported by and traverses the horizontal guides 114. As here shown the extensible unit includes a frame member 116 having rigid downwardly projecting side rails 118 and a rigid downwardly projecting end wall (not shown). Each of the longitudinal rails 118 mounts a plurality of close spaced pins or axle members 35. Each axle member or stud mounts a roller or wheel 34 of a diameter which is comparatively small. The axle studs 35 are so located that the rollers 34 will project below the bottom edge of the longitudinal rail 118 so that they may bear upon and traverse guide members 114 while the bottom edges of the rails 118 are held slightly above said guide surfaces. The axes of rotation of the rollers 34 will be parallel to each other and substantially parallel to the fork arms 108 so that the extensible member may travel in a straight path lengthwise of the guide members 112. Upright flanges 113 on the guide members 112 will restrain the extensible member from traveling in a path angularly displaced from the lengthwise direction of said guide members.

The laterally extensible unit includes a rigid load-engaging member 120 having downwardly extending rigid members 122 at opposite sides thereof. Thus the parts 120 and 122 may be of substantially inverted U-shape in cross-section as best seen in FIG. 8, of a width substantially equal to the width of the extensible frame member 120 so that the downwardly projecting parts 122 may bear upon the opposite sides of the member 116 and be substantially vertically aligned with the vertical parts 118 of the member 116 in their normal relation or position. The members 118 and 122 at each side of the structure may be connected by a plurality of similar links 124, each pivoted at one end at 126 to the rail 122 and pivoted at its opposite end 128 to the rail 118. The links 124 are rigid, are parallel to each other and extend at an angle to the vertical in normal relation of the parts when the bottom edges of the rails 122 bear upon the top of the member 116. This construction permits relative longitudinal movement of the parts 120 and 116 to a position in which the depending rails 122 are clear of the member 116 and the top surface of the part 120 is elevated relative to the position illustrated in FIG. 9. Alternatively, other means may be provided to guide raising and lowering of the member 120.

The device is equipped with power-actuated means for extending it laterally relative to the fork arms or support 108. Such means may be constructed to operate by a selected type of motive power, such as hydraulic, electrical or pneumatic. We prefer to have hydraulic means as here illustrated, which include a cylinder 130 preferably of the double-acting type. The system will be of the usual type having a control valve (not shown) which will permit the supply of liquid under pressure to a selected one of the two ends thereof and which will connect the opposite end with the intake of the pump so as to cause travel of the piston in desired direction and in a desired stroke in that direction. The power unit 130 has connection with ears or other rigid projecting members 132 carried by the base of the device. The opposite end of the power member 130 is connected to a downturned wall 134 of the extensible unit and is fixedly anchored thereto. The power unit 130 will preferably be of a length so that only one or at most a few of the rollers 34 will remain in engagement with the track 114 when the unit is extended to its maximum projection. It is important that at least one roller 34 remain in contact with the guide track 114 so that retraction of the device may proceed without difficulty or interference.

The device is also provided with power-operated means for elevating and lowering the platform 120 relative to the retractable frame 116 between the lowered position shown in FIG. 8 and an elevated position. Any source of power may be employed for this purpose but we have elected to illustrate the same as an hydraulic power member. The hydraulic power member 136 preferably has a double-acting piston connected by fluid line (not shown) with the hydraulic pressure system which may include a pump or reservoir and control valve in the manner well understood in the art, and so arranged that control of the valves will make possible the movement of the piston of the power member in selected direction.

The preferred embodiments of the invention here illustrated constitute only representative constructions embodying the invention, and it will be understood that applicants do not intend to be limited thereto, but instead contemplate all forms of racks falling within the scope of the appended claims.

We claim:

1. A rack for storage of a load mounted on a load carrier having laterally spaced depending supports and for traverse by a wheeled device adapted to pick up and carry the load carrier, said rack comprising a front rigid structure, a back rigid structure, said front structure including spaced rigid uprights and at least one horizontal member connecting adjacent uprights, and a pair of rigid horizontal members connecting said front and back structures and each including juxtaposed elongated parts defining juxtaposed carrier supporting and wheel track portions, one part of each of said last named members defining said carrier supporting portion and being located at a different elevation than said track portion.

2. A rack for storage of a load mounted on a load carrier having laterally spaced depending supports and for traverse by a wheeled device adapted to pick up and carry the load carrier, said rack comprising a front rigid structure, a back rigid structure, said front structure including spaced rigid uprights and at least one horizontal member connecting adjacent uprights, and a pair of rigid horizontal members connecting said front and back structures and each including juxtaposed elongated parts defining carrier supporting and wheel track portions, respectively, each last named horizontal member having longitudinal upward projections at the margins of said wheel track portions, one of said projections separating said carrier supporting and wheel track portions.

References Cited in the file of this patent

UNITED STATES PATENTS

| | | |
|---|---|---|
| 1,929,467 | Bales | Oct. 10, 1933 |
| 1,938,658 | Harnischfeger | Dec. 12, 1933 |
| 2,633,809 | Robinson | Apr. 7, 1953 |
| 2,785,809 | Riblet | Mar. 19, 1957 |